United States Patent
Tran et al.

(10) Patent No.: US 8,458,447 B2
(45) Date of Patent: Jun. 4, 2013

(54) BRANCH TARGET BUFFER ADDRESSING IN A DATA PROCESSOR

(75) Inventors: Thang M. Tran, Austin, TX (US); Edmund J. Gieske, Cedar Park, TX (US); Michael B. Schinzler, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 47 days.

(21) Appl. No.: 13/162,835

(22) Filed: Jun. 17, 2011

(65) Prior Publication Data

US 2012/0324209 A1 Dec. 20, 2012

(51) Int. Cl.
*G06F 7/38* (2006.01)
*G06F 9/00* (2006.01)
*G06F 9/44* (2006.01)
*G06F 15/00* (2006.01)

(52) U.S. Cl.
USPC .......................................................... 712/238

(58) Field of Classification Search
None
See application file for complete search history.

(56) References Cited

U.S. PATENT DOCUMENTS 7,873,819 B2   1/2011   Moyer et al.

OTHER PUBLICATIONS

Hoogerbrugge; Cost-Efficient Branch Target Buffers; 2000.*
Choi; Cost effective value prediction microarchitecture using partial-tag and narrow-width operands; 2001.*
Gwennap; "Sandy Bridge Spans Generations"; Microprocessor Report; Sep. 2010; pp. 2-8; The Linley Group.

* cited by examiner

*Primary Examiner* — Corey S Faherty
(74) *Attorney, Agent, or Firm* — Joanna G. Chiu; Mary Jo Bertani

(57) ABSTRACT

A data processor includes a branch target buffer (BTB) having a plurality of BTB entries grouped in ways. The BTB entries in one of the ways include a short tag address and the BTB entries in another one of the ways include a full tag address.

16 Claims, 11 Drawing Sheets

BRANCH TARGET BUFFER ADDRESSING IN A DATA PROCESSOR

BACKGROUND

1. Field

This disclosure relates generally to data processors, and more specifically, to the execution of branch instructions by data processors.

2. Related Art

Within data processing systems, branch target buffers (BTBs) are commonly used to predict the outcome of a branch and a taken target address of the branch so as to improve performance. As the number of pipeline stages within the data processing systems increases, the size of the branch target buffer (BTB) is typically increased in order to increase the hit rate and reduce the branch misprediction performance penalty. However, increasing the size of the BTB results in increased die area, access time, and power required for the BTB and its operation.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
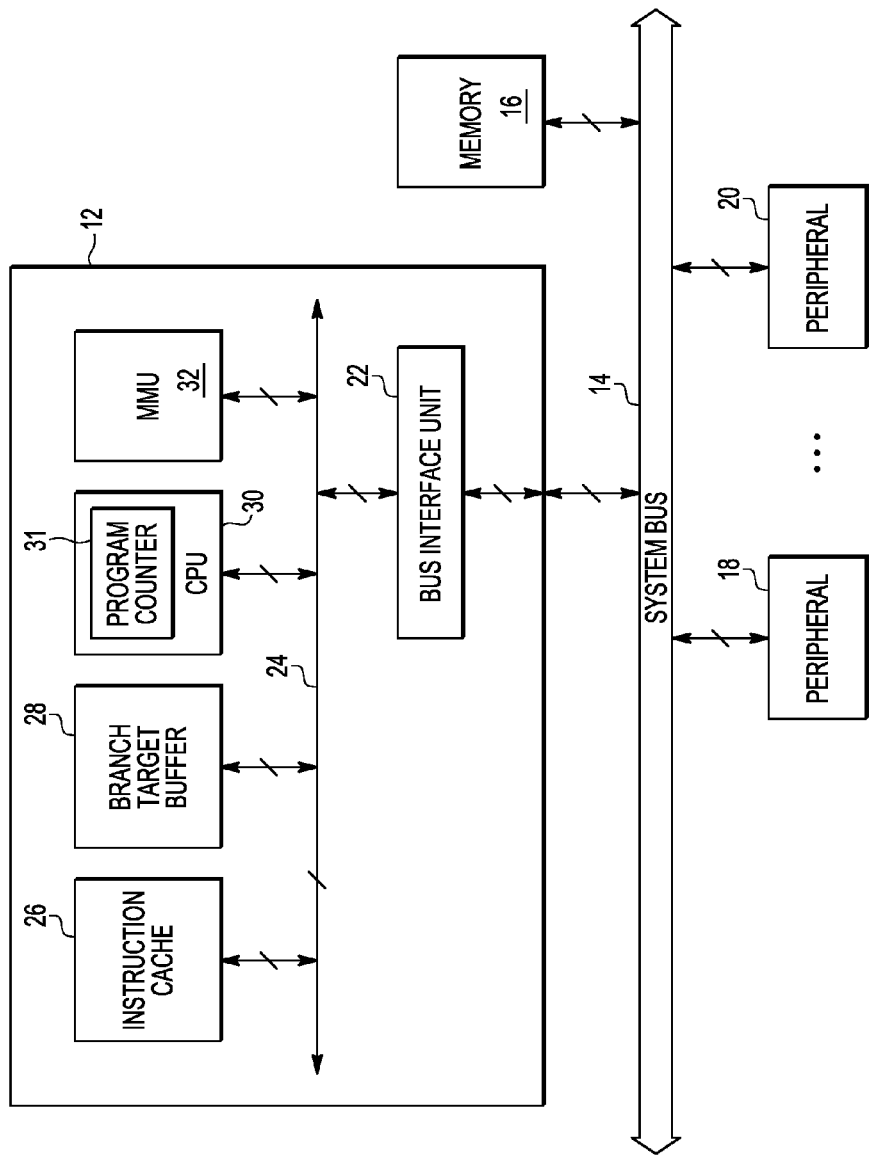
FIG. 1 illustrates in block diagram form a data processing system having a branch target buffer (BTB) in accordance with one aspect of the present invention.

As discussed above, as BTBs increase in size, area requirements increase, power demands increase and access times increased. Therefore, in one embodiment, a size of the BTB is decreased while maintaining performance. In one embodiment, a set associative multi-way BTB is implemented in which different ways of the BTB can store different combinations of tag sizes and target address sizes. In one embodiment, the tag sizes are based on page boundaries of the memory such that for branch instructions which cross over a page boundary, a full tag is stored in the BTB, while for branch instructions within a same page, a short tag (requiring less bits than the full tag) is stored in the BTB. In one embodiment, for those BTB entries which store a short tag, an additional page address buffer (e.g. a page address content addressable memory (CAM)) is used to store the page addresses for use with these shorter tags. For each entry which stores a short tag, a corresponding select value is also stored and used to select an appropriate entry of the page address CAM. Furthermore, based on whether the branch target crosses a page boundary, either full or short target addresses may be stored in the target address portion of each entry within the BTB.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals.

FIG. 1 illustrates, in block diagram form, a data processing system 10 in accordance with one embodiment of the present invention. Data processing system 10 includes a processor 12, a system bus 14, a memory 16 and a plurality of peripherals such as a peripheral 18, a peripheral 20 and, in some embodiments, additional peripherals as indicated by the dots in FIG. 1 separating peripheral 18 from peripheral 20. Memory 16 is a system memory that is coupled to system bus 14 by a bidirectional conductor that, in one form, has multiple conductors. In the illustrated form each of peripherals 18 and 20 is coupled to system bus 14 by bidirectional multiple conductors as is processor 12. Processor 12 includes a bus interface unit (BIU) 22 that is coupled to system bus 14 via a bidirectional bus having multiple conductors. BIU 22 is coupled to internal bus 24 via bidirectional conductors. Internal bus 24 is a multiple-conductor communication bus. Coupled to internal bus 24 via respective bidirectional conductors is an instruction cache 26, a branch target buffer (BTB) 28, a central processing unit (CPU) 30, and a memory management unit (MMU) 32. CPU 30 is a processor for implementing data processing operations. Within CPU 30 is a program counter 31 which is a storage device such as a register for holding a count value. Each of instruction cache 26, BTB 28, CPU 30 and MMU 32 are coupled to internal bus 24 via a respective input/output (I/O) port or terminal. In alternate embodiments, system bus 14 may be implemented as a cross bar switch or interconnect fabric.

In operation, processor 12 functions to implement a variety of data processing functions by executing a plurality of data processing instructions. Instruction cache 26 is a temporary data store for frequently-used information that may be needed by CPU 30. Information needed by CPU 30 that is not within cache 26 is stored in memory 16. MMU 32 controls interaction of information between CPU 30 and instruction cache 26 and memory 16. For example, MMU 32 translates between virtual addresses (as used, for example, within CPU 30) and physical addresses (as used, for example, by instruction cache 26 and memory 16). BIU 22 may be one of several interface units between processor 12 and system bus 14. BIU 22 functions to coordinate the flow of information related to instruction execution including branch instruction execution by CPU 30. Control information and data resulting from the execution of a branch instruction are exchanged between CPU 30 and system bus 14 via BIU 22. BTB 28 is a buffer for storing a plurality of entries. Each of the entries stores an instruction address which corresponds to a branch instruction, a corresponding branch target address for the branch instruction, corresponding status information, and corresponding branch prediction information. Fewer or additional information can be stored in each entry. CPU 30 generates instruction addresses which are provided to the instruction pipeline within CPU 30 and are sent via internal bus 24 to BTB 28. BTB 28 contains a subset of instruction addresses that may be generated by CPU 30. In response to receiving an instruction address from CPU 30 which hits in BTB 28, BTB 28 provides a branch target address and associated status information to CPU 30. Note that the branch target address provided by BTB 28, as will be described in further detail below, is speculative and thus may result in a misprediction.

Figure 2:
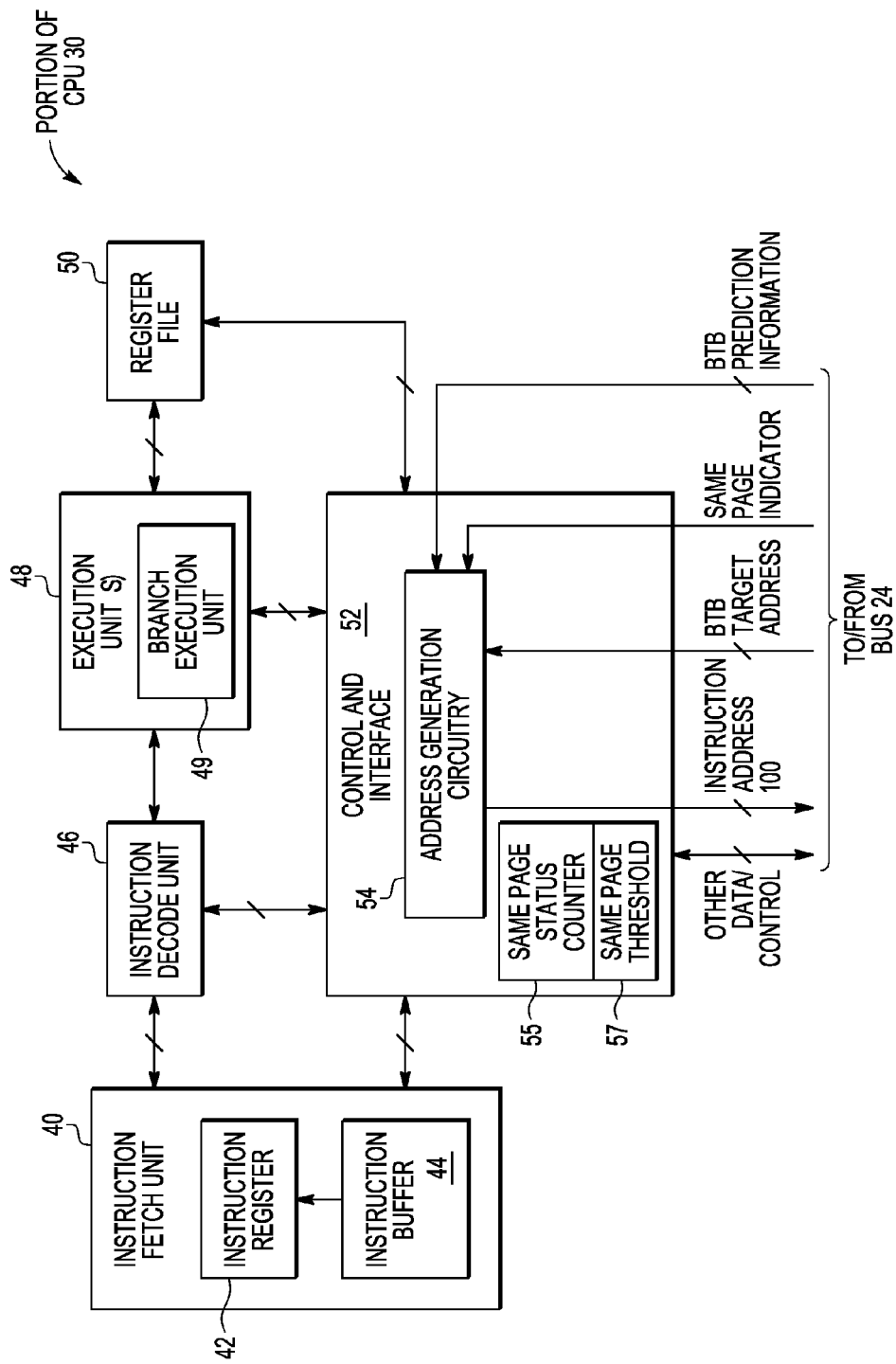
FIG. 2 illustrates in block diagram form a portion of a central processing unit (CPU) of the data processing system of FIG. 1 in accordance with one aspect of the present invention.

Illustrated in FIG. 2 is a more detailed portion of CPU 30 of FIG. 1 that relates to the execution of instructions and the use of BTB 28. CPU 30 includes a control and interface unit 52, and instruction fetch unit 40, an instruction decode unit 46, execution unit(s) 48, and a register file 50. Control and interface unit 52 includes address generation circuitry 54, a same page status counter 55, and same page threshold 57, and is bidirectionally coupled to each of instruction fetch unit 42, instruction decode unit 46, execution unit(s) 48, and register file 50. Address generation circuitry 54 provides an instruction address 100 to bus 24, and receives a BTB target address, a same page indicator, and BTB prediction information from bus 24. Address generation circuitry 54 may also communicate other data/control information with bus 24. Instruction fetch unit 40 includes an instruction buffer 44 and an instruction register 42. Instruction buffer 44 has an output that is connected to an input of instruction register 42. Instruction buffer is bidirectionally coupled to instruction decode unit 46. Execution unit(s) includes a branch execution unit 49 and may include one or more additional execution units, as needed within CPU 30.

In the illustrated form of this portion of CPU 30, control and interface unit 52 controls instruction fetch unit 40 to implement the fetching of instructions from instruction cache 26 or memory 16. Instruction decode unit 46 performs instruction decoding for the one or more execution unit(s) 48. Register file 50 is used to support execution unit(s) 48. Within control and interface unit 52 is address generation circuitry 54. Address generation circuitry 54 sends out an instruction address to BTB 28, and, in response, may receive a BTB target address, a same page indicator, and BTB prediction information. The BTB target address is used by CPU 30 to obtain an instruction at the target address from either instruction cache 26 or memory 16 if the target address is not present and valid within instruction cache 26.

Figure 3:
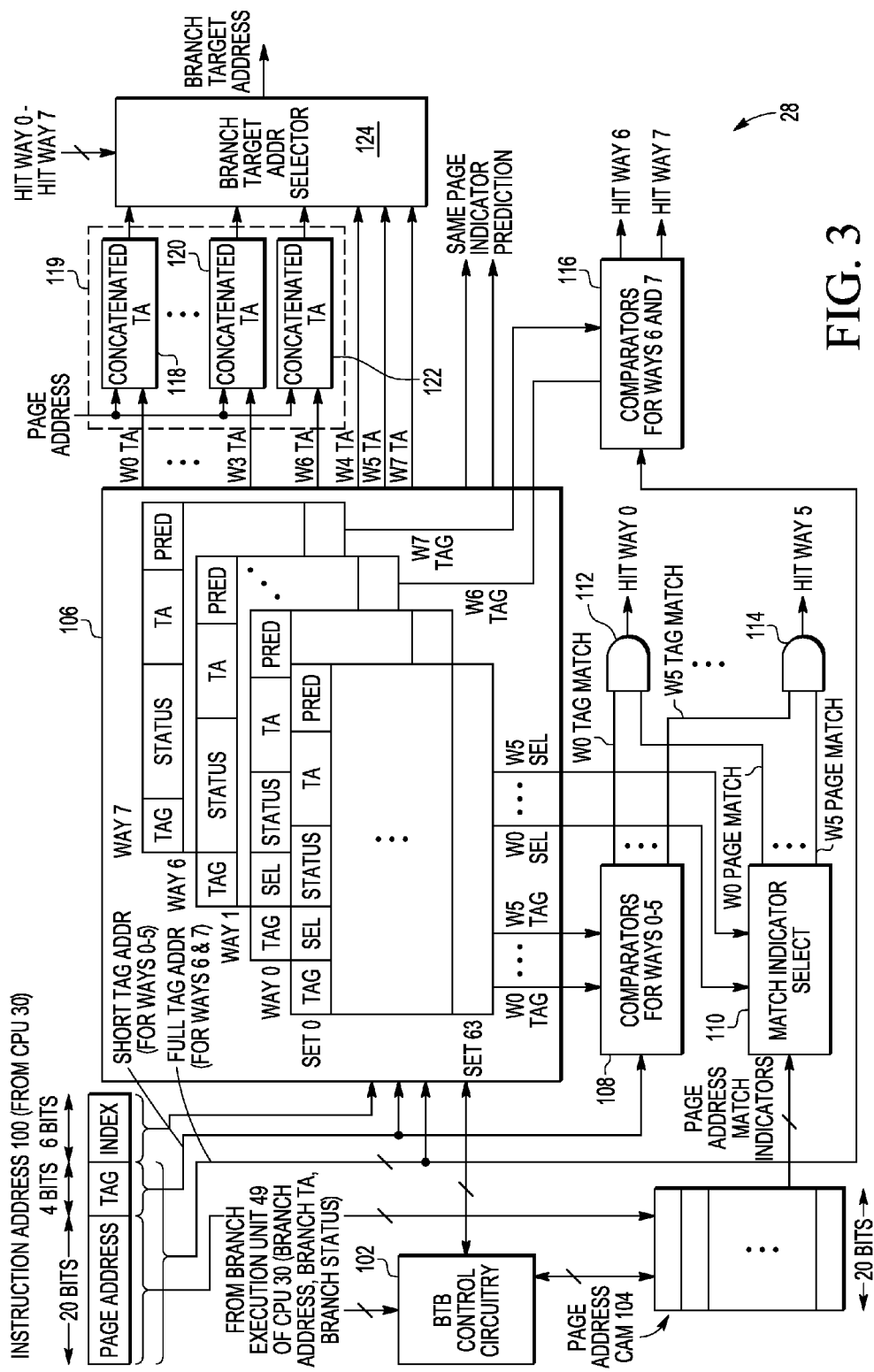
FIG. 3 illustrates in block diagram form a portion of the BTB of FIG. 1 in accordance with one aspect of the present invention.

Illustrated in FIG. 3 is further detail of BTB 28 in accordance with one embodiment. BTB 28 receives instruction address 100 from CPU 30 in which instruction address 100 includes a page address portion, a tag portion, and an index portion. In the illustrated embodiment, the page address portion includes the 20 most significant bits of instruction address 100, the tag portion includes the next 4 most significant bits, and the index portion includes the next 6 most significant bits. In one embodiment, instruction address 100 includes a total of 32 bits in which the 2 least significant bits are not used by BTB 28. BTB 28 includes a BTB array 106, BTB control circuitry 102, comparators for ways 0-5 108, comparators for ways 6 and 7 116, page address content addressable memory (CAM) 104, match indicator select 110, AND gates 112 and 114, branch targets generator 119, and branch target address selector 124. In the illustrated embodiment, BTB 28 is a multiple way set-associative BTB, in which BTB array 106 includes 8 ways (way 0-way 7) and 64 sets (set 0-set 63). An entry of BTB 28 therefore refers to the intersection of a set and a way, such that, for example, each way of BTB 28 includes 64 entries. Note that BTB 28 may include any number of ways and any number of sets, or alternatively, may be a direct mapped BTB. Also, note that each of way 0-way 7 may be referred to as w0-w7, respectively. BTB array 106 receives instruction address 100 and is bidirectionally coupled to BTB control circuitry 102. BTB control circuitry 102 also receives information from branch execution unit 49 of CPU 30 (such as, for example, a branch instruction address, a branch target address, and branch status), and is also bidirectionally coupled to page address CAM 104. BTB array 106 provides w0 tag-w5 tag to comparators 108, provides w0 sel-w5 sel to match indictor select 110, and provides w6 tag and w7 tag to comparators 116. Comparators 108 also receives the tag portion (also referred to as the short tag address) of instruction address 100 and provides w0 tag match to a first input of AND gate 112 and provides w5 tag match to a first input to AND gate 114. Match indictor select 110 receives page address match indicators from page address CAM 104 and provides a w0 page match to a second input of AND gate 112 and provides a w5 page match to a second input of AND gate 114. AND gate 112 provides a hit way 0 signal at its output and AND gate 114 provides a hit way 5 signal at its output. BTB 28 also includes additional AND gates, as indicated by the 3 dots between AND gates 112 and 114, in which each AND gate receives a way tag match signal from comparators 108 at a first input and receives a way page match signal from match indicator select 110 at a second input and provides a corresponding way hit signal at the output. Therefore, in the illustrated embodiment, 4 additional AND gates may be present to provide hit way 1 signal-hit way 4 signal. Comparators 116 receives the full tag address of instruction address 100 (which corresponds to the page address portion together with the tag portion of instruction address 100) and provides hit way 6 signal and hit way 7 signal. Note that each of comparators 108 and 116 may also receive status bits from BTB array 106. For example, each of comparators 108 and 116 may use valid bits to qualify the matches.

Concatenated target address (TA) 118 is storage circuitry which receives w0 TA from BTB 106 and the page address portion of instruction address 100 and stores the page address concatenated with w0 TA. Concatenated target address (TA) 120 is storage circuitry which receives w3 TA from BTB 106 and the page address portion of instruction address 100 and stores the page address concatenated with w3 TA. Each of w1 TA and w2 TA are also provided to concatenated target address storage circuitries such that the page address portion of instruction of instruction address 100 can be concatenated with each of w1 TA and w2 TA. The concatenated addresses for each of w0 TA-w3 TA and w6 TA are provided to branch target address selector 124. Each of w4 TA, w5 TA, and w7 TA are provided to branch target address selector 124. Branch target address selector 124 also receives each of hit way signals hit way 0-hit way 7, and outputs a branch target address. BTB array 106 also provides a same page indicator and a prediction indicator. Each of the branch target address from branch target address selector 124 and same page indicator and prediction indicator from BTB array 106 may all be provided to control and interface unit 52 (such as to address generation circuitry 54) by way of bus 24. Branch targets generator 119 receives each of w0 TA-w7 TA, provides target addresses to branch target address selector 124, and includes concatenated TA 118, concatenated TA 120, and concatenated TA 122.

Referring to FIGS. 2 and 3, BTB 28 receives instruction address 100 from CPU 30 and determines whether instruction address 100 results in a hit within BTB 28. BTB prediction information for instruction address 100 returned back to CPU 30 may include a hit indication (based on hit way signals hit way 0-hit way 7) and prediction information. Also, the branch target address from branch target address selector 124 is provided as BTB target address to CPU 30. In one embodiment, instruction addresses are fetched by instruction fetch unit 40 (either individually or in groups of two or more at a time) from instruction cache 26 or memory 16. Each instruction fetched by instruction fetch unit 40 is placed in instruction buffer 44 and provided as instruction address 100 to BTB 28 to determine whether or not BTB 28 indicates that the instruction address corresponds to a branch instruction. For example, if instruction address 100 results in a miss in BTB 28, it is assumed that instruction address 100 is not a branch instruction, and processing of instruction address 100 continues through the instruction pipeline of CPU 30 (and indication of the miss may be provided to CPU via the BTB prediction information). However, if instruction address 100 results in a hit in BTB 28, it is assumed instruction address 100 is a branch instruction, and the BTB prediction information may be used to determine whether the branch instruction should be taken or not taken. If, for example, instruction address 100 hits in BTB 28 and the BTB prediction information received from BTB 28 indicates a taken branch, then control and interface 52 may provide the BTB target address (received from BTB 28) to instruction fetch unit 40 so that fetching can speculatively begin at the branch target address. Eventually, instruction address 100 reaches instruction register 42 and proceeds through the instruction pipeline of CPU 30. That is, it is provided from instruction register 42 to instruction decode unit 46 for decode, and then to execution unit(s) 48 for execution (which may access register file 50, as needed). If instruction address 100 is decoded as a branch instruction, it is resolved by branch execution unit 49. When instruction address 100 is resolved, it is known whether or not BTB 28 correctly predicted the branch instruction of instruction address 100 as taken. If the branch was correctly predicted, execution continues from the current location. If the branch was mispredicted, CPU 30 can address the misprediction, flush the pipeline as needed, and return execution to the point at which the misprediction occurred (such as returning to instruction address 100 and fetching the next sequential instruction). Therefore, a misprediction may occur when a hit occurs in BTB 28, but the branch is not correctly predicted as taken or not taken, or may occur if BTB 28 correctly predicts the branch as taken but incorrectly predicts the target address. A misprediction may also occur if instruction address 100 hits in BTB 28 but turns out to not be a branch instruction. For example, it may be determined by instruction decode unit 46 that instruction address 100 was actually not a branch instruction, which also results in a misprediction needing to be addressed by CPU 30.

Furthermore, for each instruction address 100, BTB 28 may be allocated or updated as needed. For example, when an instruction results in a miss in BTB 28 and is decoded by instruction decode unit 46 as a taken branch instruction, a new entry can be allocated for the branch instruction into BTB 28. Also, if a branch which did hit in BTB 28 results in a misprediction, its corresponding entry in BTB 28 may be appropriately updated. Operation of BTB 28 will be described in more detail in reference to FIGS. 4-12 below.

Referring to FIG. 3, each of way 0-7 in BTB array 106 includes a plurality of entries. In the illustrated embodiment, each of the entries include a tag field to store a tag address, a status field to store status information, a TA field to store a target address, and a pred field to store prediction information. However, as will be described in reference to FIGS. 4-8 and 13, the entries in each way may differ, depending on the way.

Figure 4:
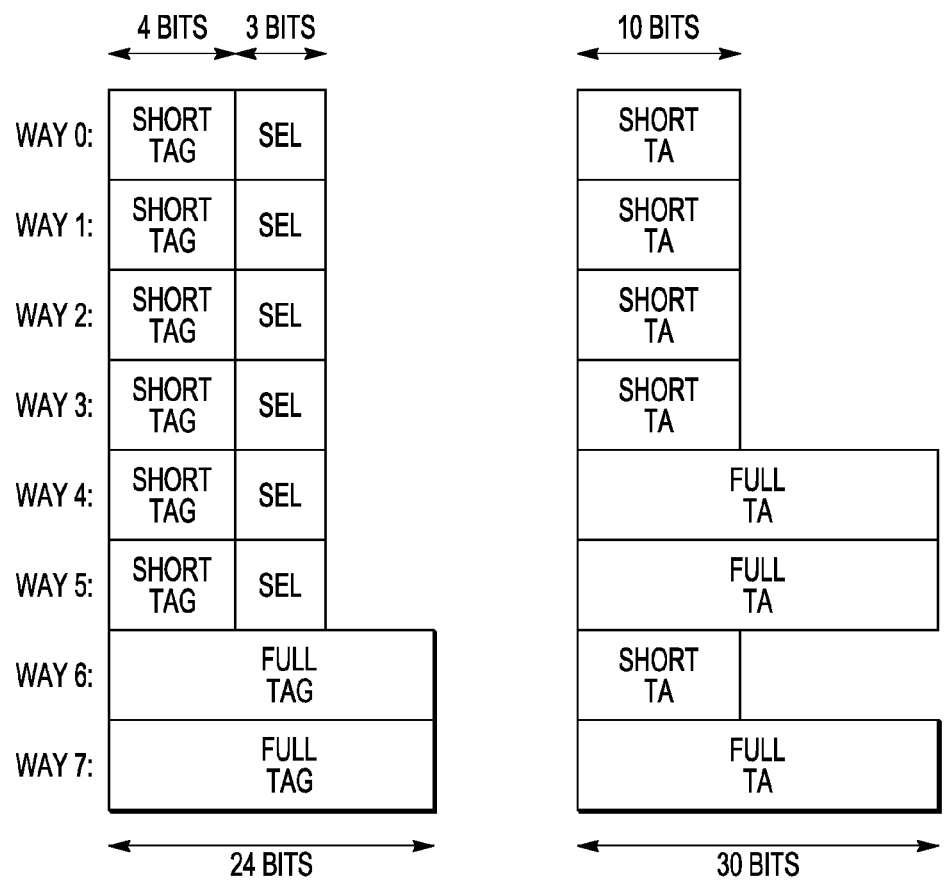
FIG. 4 illustrates in diagrammatic form an embodiment of the tags and targets of the BTB of FIG. 3 in accordance with one aspect of the present invention.

For example, referring to FIG. 4, each way may be configured to store different lengths of tags and target addresses (TAs). For example, the entries in each of way 0-way 3 store a short tag address and a short TA. The entries in each of way 4 and way 5 store a short tag address and a full TA. The entries in way 6 store a full tag address and a short TA and the entries in way 7 store a full tag address and a full TA. In one example, which assumes a 4K page size, a full tag address may be a 24 bit value while a short tag address may only be a 4-bit value. This 4-bit value allows for indexing into a particular page. Therefore, in one embodiment, a full tag address is an address which does not require any more bits to complete the address while a short tag address requires additional bits to complete the full tag address. Furthermore, each entry which stores a short tag address also includes a select field. This select field is used to provide the remaining upper bits of the tag address. For example, in the current example, the select field is used to provide the remaining upper 20 bits of the tag address which corresponds to the page address. In one embodiment, the page addresses for the short tags stored within ways 0-5 is stored in page address CAM 104. Page address CAM 104 can have any number of entries, and in one embodiment, includes 8 entries. In the current example assuming a page size of 4K, each entry in CAM 104 stores a 20-bit page address. In one embodiment, CAM 104 performs a match between the page address portion of instruction address 100 and provides one page address match indicator for each of its entries, as illustrated in FIG. 3. Therefore, the select field may be a 3-bit value used to select the appropriate page address match indicator from the 8 page address match indicators. The size of the select field may therefore be dependent on the number of entries within page address CAM 104. For those entries which store a full tag address, no select field is needed since no additional address bits are needed to complete the tag address.

Still referring to FIG. 4, the entries in way 0-way 3 and way 6 each store a short TA while the entries in way 4, way 5, and way 7 each store a full target address. In one embodiment, each short TA may only be 10 bits while the full TA may be 30 bits. Therefore, in one embodiment, a full TA is an address which does not require any more bits to complete the addressing of the desired data while a short TA requires additional bits to complete the full TA. In one embodiment, when a TA from any of way 0-way 3 or way 6 is provided, it is first concatenated with the page address portion of instruction address 100 to provide the full TA. That is, as illustrated in FIGS. 3, w0 TA-w3 TA and w6 TA are each concatenated to the page address portion prior to being provided to branch target address selector. However, since w4 TA, w5 TA, and w7 TA are the full TAs, they are provided directly to branch target address selector 124. As will be described in more detail below, branch target address selector 124 chooses one of the received full TAs, based on indicators hit way 0-hit way 7, to provide as the branch target address.

Figure 5:
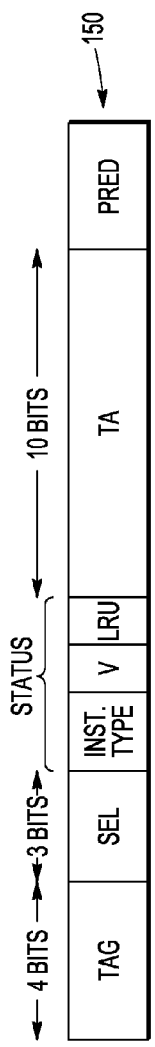
FIGS. 5-8 illustrate in diagrammatic form entries in the BTB of FIG. 3 in accordance with various aspects of the present invention.

FIG. 5 illustrates, in diagrammatic form, a more detailed view of an example entry 150 of a way whose entries store a short tag and a short TA. For example, entry 150 may be the format for entries in ways 0-3. Entry 150 includes a 4-bit tag address, a 3-bit select field, a status field, a 10-bit TA field, and a pred field. In one example, the status field includes various fields, such as an instruction type field, a valid field, and a least recently used (LRU) field (which may be used, for example, during allocation into BTB 28). Note that they LRU fields may be stored separately from BTB array 106 and each LRU field may correspond to an entire set. The prediction field may include prediction information such as whether or not the branch corresponding to the tag address is predicted taken or not taken.

Figure 6:
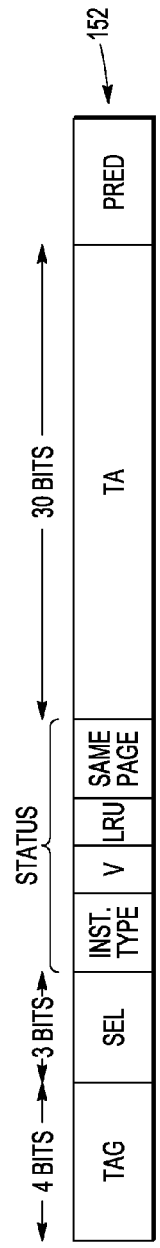

FIG. 6 illustrates, in diagrammatic form, a more detailed view of an example entry 152 of a way whose entries store a short tag and a full TA. For example, entry 152 may be the format for entries in ways 4 and 5. Entry 152 includes a 4-bit tag address, a 3-bit select field, a status field, a 30-bit TA field, and a pred field. In one example, the status field includes various fields, such as an instruction type field, a valid field, an LRU field (which may be used, for example, during allocation into BTB 28), and a same page indicator field. In one embodiment, the same page indicator is a single bit field which indicates whether the full TA is located on a same page as the branch address. The prediction field may include prediction information such as whether or not the branch corresponding to the tag address is predicted taken or not taken.

Figure 7:
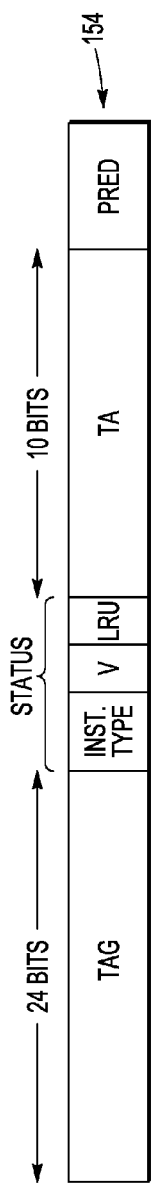

FIG. 7 illustrates, in diagrammatic form, a more detailed view of an example entry 154 of a way whose entries store a full tag and a short TA. For example, entry 154 may be the format for entries in way 6. Entry 154 includes a 24-bit tag address, a status field, a 10-bit TA field, and a pred field. In one example, the status field includes various fields, such as an instruction type field, a valid field, and an LRU field (which may be used, for example, during allocation into BTB 28). The prediction field may include prediction information such as whether or not the branch corresponding to the tag address is predicted taken or not taken.

Figure 8:
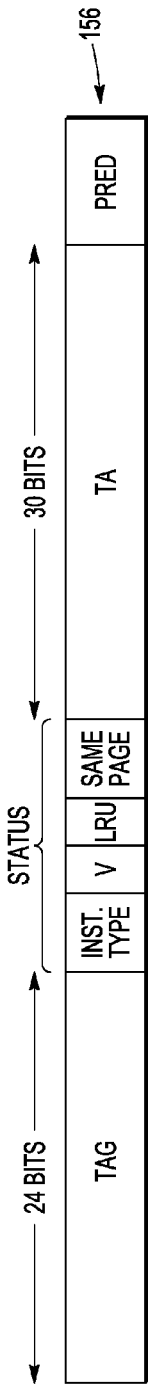

FIG. 8 illustrates, in diagrammatic form, a more detailed view of an example entry 156 of a way whose entries store a full tag and a full TA. For example, entry 156 may be the format for entries in way 7. Entry 156 includes a 24-bit tag address, a status field, a 30-bit TA field, and a pred field. In one example, the status field includes various fields, such as an instruction type field, a valid field, an LRU field (which may be used, for example, during allocation into BTB 28), and a same page indicator field. In one embodiment, the same page indicator is a single bit field which indicates whether the full TA is located on a same page as the branch address. The prediction field may include prediction information such as whether or not the branch corresponding to the tag address is predicted taken or not taken.

Note that for each of the example entries in FIGS. 5-8, the number of bits for each field may vary, depending on the application, and more or less fields may be present than those illustrated. Furthermore, the format of each entry can be different than the illustrated formats.

Note that, in alternate embodiments, the short tag can be any portion of an address, where a separate storage unit, such as a CAM, can be used to store the remaining most significant portion of the full tag address. That is, it need not be dependent on pages or the page size. In this case, any size CAM may be used, as appropriate, and any size select field, as appropriate, may be used. Also, in alternate embodiment, any type of page address buffer may be used in place of page buffer CAM 104. Also, note that the organization of ways 0-7 illustrated in FIG. 4 is only one example. That is, in alternate embodiments, any combination of short tag/full tag and short TA/full TA can be used for each way, and is not limited to the particular example of FIG. 4. For example, in one alternate embodiment, each way may store the full TA for all entries. In yet another example, only one way may store the full tag addresses, while the remaining ways store the short tags with the select bits. For example, an alternate embodiment will be described below in reference to FIG. 13. Therefore, each of the entries illustrated in FIGS. 5-8 and 13 are only examples based on a BTB which is set up according to the example of FIG. 4.

Figure 9:
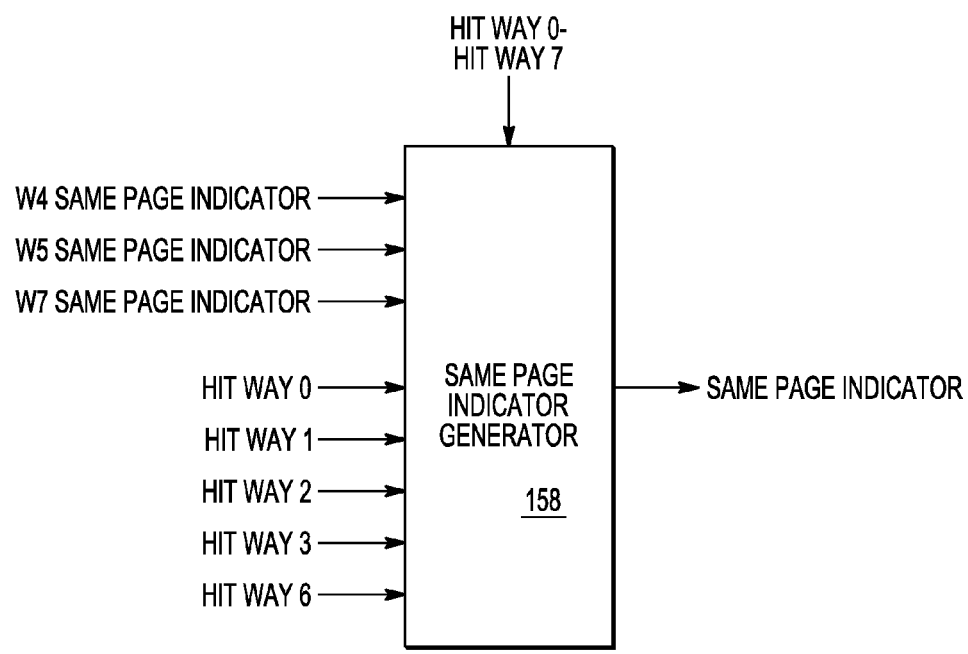
FIG. 9 illustrates in block diagram form an embodiment of a same page indicator generator of the BTB of FIG. 3 in accordance with one aspect of the present invention.

Illustrated in FIG. 9 is a same page indicator generator 158 which may be used, for example, within BTB 28 to generate the same page indicator. Same page indicator generator 158 receives a same page indicator from the status field of each of ways 4, 5, and 7 (e.g. w4 same page indicator, w5 same page indicator, and w7 same page indicator) and also receives the hit indicators from each of ways 0-3 and 6 (e.g. hit way 0-hit way 3 and hit way 6). Based on hit way 0-hit way 7 (which indicates which way, if any, resulted in a hit for instruction address 100), same page indicator generator 158 generates the same page indicator which indicates whether the branch target address provided by branch target address selector 124 is on a same page as instruction address 100. Note that since each of ways 0-3 and 6 store a short TA, it is assumed that a hit in any of these ways occurs on a same page as instruction address 100. However, since ways 4, 5, and 7 store the full TA, it is not known whether the TA is on the same page or not. Therefore, each of the entries in ways 4, 5, and 7 also store the same page indicator to provide this information. The same page indicator provided by same page indicator generator 158 allows for the determination to be made as to whether or not address translation by MMU 32 is needed for the branch TA. That is, if it is on the same page, as indicated by the same page indicator, MMU 32 can be bypassed. However, if it is not on the same page, then MMU 32 needs to provide the address translation.

Figure 10:
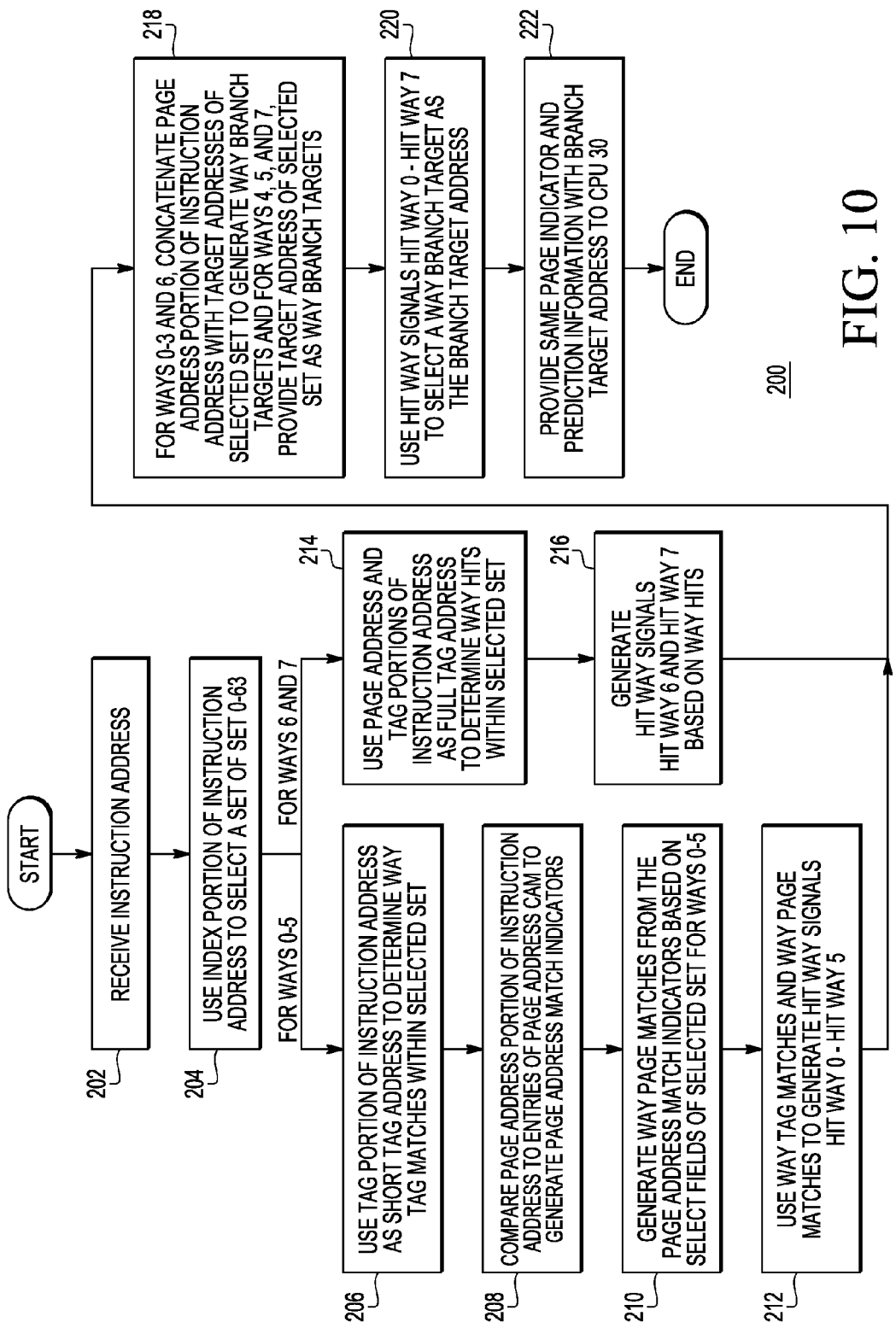
FIG. 10 illustrates in flow diagram form a method for generating a branch target address in accordance with one aspect of the present invention.

FIG. 10 illustrates, in flow diagram form, a method 200 for generating a branch target address by BTB 28 in accordance with one embodiment of the present invention. Method 200 begins with block 202 in which an instruction address is received (which may correspond to instruction address 100 of FIG. 3). Flow then proceeds to block 204 in which the index portion of the instruction address is used to select a set from sets 0 to 63. For example, referring to FIG. 3, BTB array 106 receives the index portion of instruction address 100 which selects one set of sets 0-63. Therefore, the way tags (w0 tag-w7 tag) and the select fields (w0 sel-w5 sel) correspond to the way tags and the select fields stored in the selected set. Similarly, the way TAs (w0 TA-w7 TA) correspond to the way TAs stored in the selected set.

For ways 0-5, method 200, continues with block 206 in which a tag portion of instruction address 100 is used to determine the way tag matches (e.g. w0 tag match-w5 tag match) within the selected set. Referring to FIG. 3, comparators for ways 0-5 108 receive each of w0 tag-w5 tag of the selected set from BTB array 106 and compares them each to the tag portion of instruction address 100. Comparators 108 therefore outputs w0 tag match-w5 tag match which indicates whether, for each of ways 0-5, a match occurred with the tag portion of instruction address 100. (Note that w0 tag match-w5 tag match may also be referred to as way tag match signals or short way tag match signals.) Note that comparators 108 uses the valid bits of the selected set to qualify the matches such that each of w0 tag match through w5 tag match signals is only asserted to indicate that a match occurred if the corresponding tag from the selected set which matched is from a valid entry (as indicated by the status bits of the entry). Method 200 then continues with block 208 in which a page address portion of instruction address 100 is compared to entries of page address CAM 104 to generate page address match indicators. Referring to FIG. 3, page address CAM 104 receives the page address portion of instruction address 100 and outputs one page address match indicator for each entry in CAM 104 to indicate whether or not the entry matches the page address portion of instruction address 100. Method 200 continues with block 210 in which way page matches (e.g. w0 page match-w5 page match) are generated from the page address match indicators based on the select fields (e.g. w0 sel-s5 sel) of the selected set. Referring to FIG. 3, for each of ways 0-5, the corresponding select field is used to select a page address match indicator provided by page address CAM 104, and match indicator select 110 provides the selected page address match indicator as the way page match. For example, for way 0, match indicator select 110 uses the 3-bit value of w0 sel to select one of the 8 page address match indicators from the page address match indicators and provides this selected page address match indicator as w0 page match. Therefore, in one embodiment, page address CAM 104 may also include comparators for generating the page address match indicators used by match indicator select 110. Alternatively, match indicator select 110 may include the comparators such that page address CAM 104 provides the page addresses to match indicator select 110, and match indicator select 110 receives the page address portion of instruction address 100 and performs the comparisons to generate the page address match indicator. Therefore, in this embodiment, the select fields may be used to select the appropriate page address from page address CAM 104 with which to perform the page address comparison for generating the corresponding way page matches.

After block 210, method 200 continues with block 212 in which the way tag matches and the way page matches are used to generate hit way signals hit way 0-hit way 5. (Note that hit way 0-hit way 5 may also be referred to as short hit way signals.) Referring to FIG. 3, an AND gate, such as AND gates 112 and 114, receives each of a way tag match signal and the corresponding way tag match signal to generate the corresponding way hit signal. For example, for way 0, AND gate 112 receives w0 tag match and w0 page match, and provides hit way 0 at its output. Therefore, hit way 0 is asserted to indicate a hit of way 0 only if w0 tag match is asserted (indicating that the w0 tag of the selected set is valid and matched the tag portion of access address 100) and w0 page match is asserted (indicating that the selected page address in page address CAM 14, as selected by w0 sel matched the page address portion of instruction address 100). In this manner, for each of ways 0-5, a comparison of the short tags is made and a comparison with the appropriately selected page address (selected by the select field of the selected set) is made to generate the hit way signal. Therefore, method 200 may perform the method of blocks 206, 208, 210, and 212 for those ways which store a short tag address. Note that the AND gates used to generate the short hit way signals may be referred to as a logic circuit and that, in alternate embodiments, a different logic circuit may be used to generate the short hit way signals.

Referring back to block 204, for ways 6 and 7, flow proceeds to block 214 in which the page address and tag portions of instruction address 100 is used as a full tag address of instruction address 100 to determine way hits within the selected set. Referring to FIG. 3, comparators for ways 6 and 7 116 receive the full address tags for ways 6 and 7 of the selected set (w6 tag and w7 tag) and receives the page address and tag portions of instruction address 100 as the full tag address of instruction address 100. Method 200 proceeds to block 216 in which hit way signals, hit way 6 and hit way 7, are generated based on the way hit signals. For example, comparators 116 compare each of w6 tag and w7 tag to the full tag address portion of instruction address 100 and generates hit way 6 and hit way 7, respectively. For example, in one embodiment, hit way 6 is asserted if w6 tag matches the full tag address portion of instruction address 100. Note that comparators 116 also uses the valid bits of the selected set to qualify the matches such that each of hit way 6 and hit way 7 is only asserted to indicate that a match occurred if the corresponding tag from the selected set which matched is from a valid entry (as indicated by the status bits of the entry). Therefore, method 200 may perform the methods of blocks 214 and 216 for those ways which store a full tag address. Note that hit way 6 and hit way 7 may also be referred to as full hit way signals.

After block 212 or block 216, method 200 continues with block 218 in which, for ways 0-3 and 6 (which store short TAs), the page address portion of instruction address 10 is concatenated with the corresponding target address (e.g. w0 TA-w3 TA and w6 TA) of the selected set to generate way branch targets. For example, the way branch targets may correspond to the outputs of the concatenated storage circuitries (such as concatenated storage circuitry 118, 120, and 122) which concatenate the page address portion of instruction address 100 with the corresponding way TA. The outputs of the concatenated storage circuitries are then provided to branch target address selector 124. Still referring to block 218, for ways 4, 5, and 7 (which store full TAs), the TAs from the selected set are provided as way branch targets. Therefore, since the TAs from these ways are the full TAs, they can be provided directly to branch target address selector 124. Method 200 then continues with block 220 in which the way hit signals, hit way 0-hit way 7, are used to select a way branch target as the branch target address. For example, branch target address selector 124, based on which hit way signal is asserted, selects the branch target address for the corresponding way. The branch target address selected by branch target address selector 124 can therefore be provided as the BTB target address to control and interface 52 of CPU 30. Method 200 continues with block 222 in which the same page indicator and prediction information (corresponding to the way of the selected set which resulted in the hit) can be provided to control and interface 52 of CPU 30 as the prediction information and the same page indicator. Note that, in one embodiment, if none of the ways of the selected set results in a hit, this miss information may be provided by way of a separate hit/miss indicator or by way of the prediction information to CPU 30.

Figure 11:
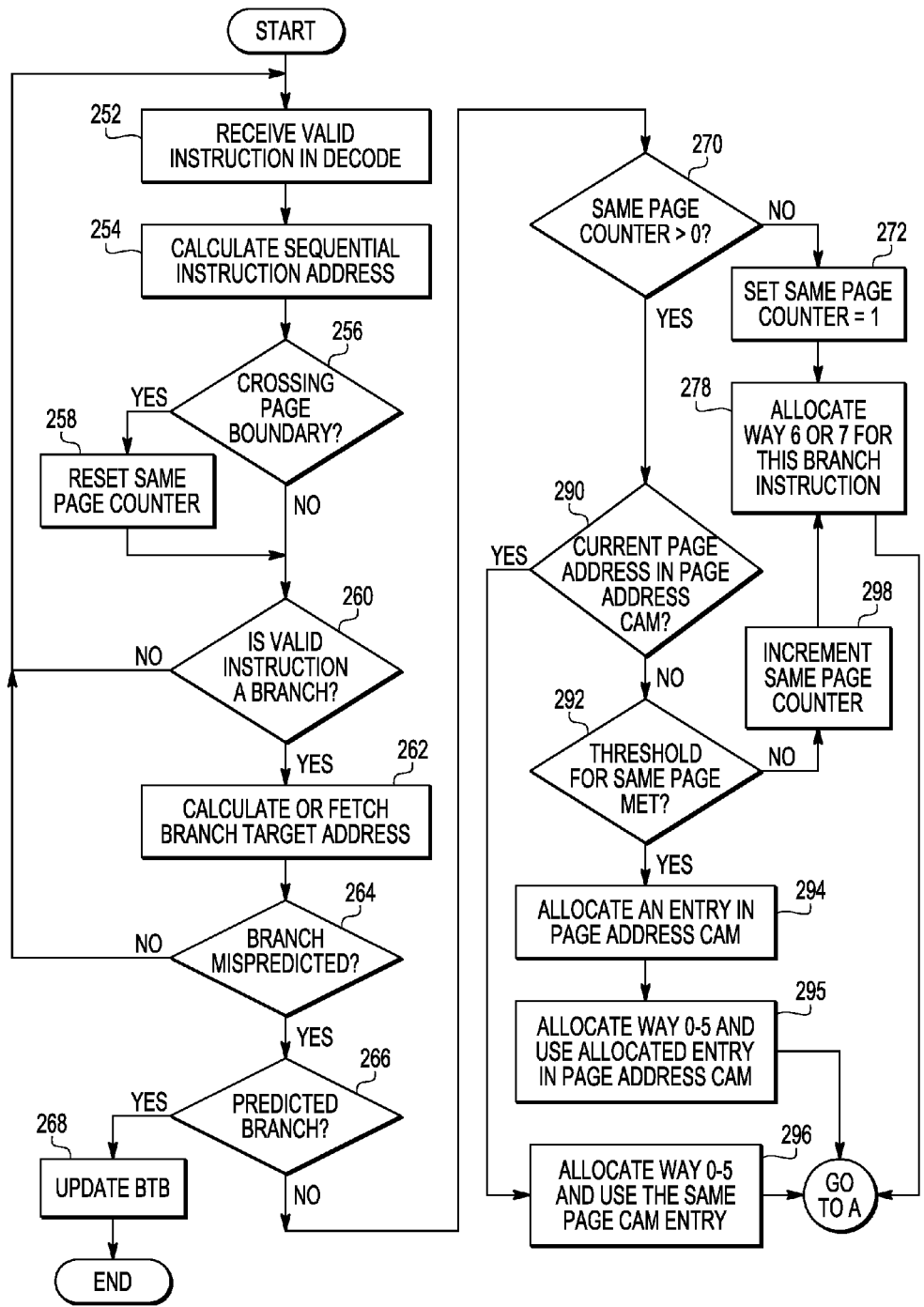
FIGS. 11 and 12 illustrates in flow diagram form a method for allocation in the BTB in accordance with one aspect of the present invention.
Figure 12:
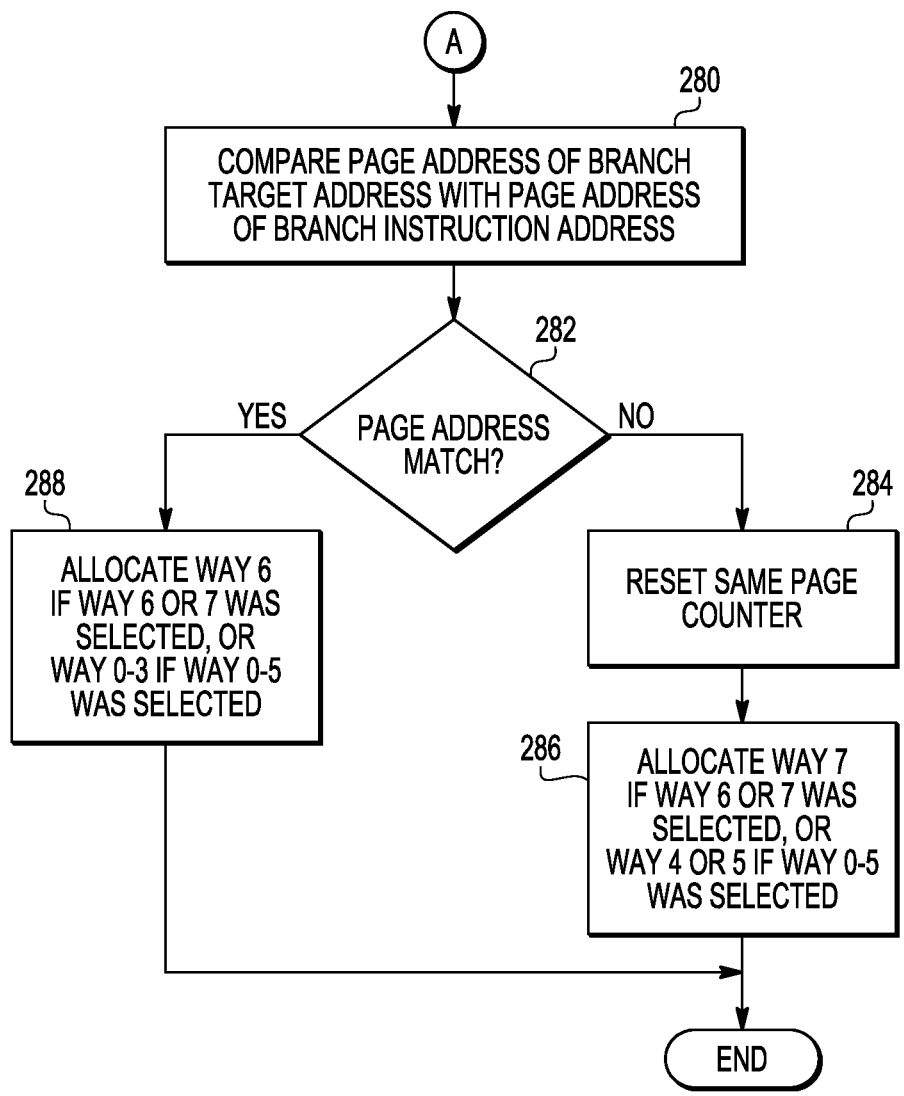

FIGS. 11 and 12 illustrate, in flow diagram form, a method 250 for allocation in BTB 28 in accordance with one aspect of the present invention. Method 250 begins at block 252 in which a valid instruction is received in decode. For example, referring to FIG. 2, a valid instruction in instruction register 42 is provided by instruction fetch unit 40 to instruction decode unit 46. Method 250 continues with block 254 in which the sequential instruction address is calculated for the instruction. The method proceeds to decision diamond 256 in which it is determined if the sequential instruction address causes instruction flow to cross a page boundary. (This may be performed, for example, by control and interface 52 or within instruction decode unit 46.) If so, flow proceeds to block 258 in which a same page counter is reset. For example, referring to FIG. 2, the same page counter may refer to same page status counter 55, and in block 258, counter 55 may be reset to a first predetermined value, such as, for example, zero. After block 258, or if a page boundary is not crossed in decision diamond 256, method 250 proceeds to decision diamond 260 in which it is determined whether the valid instruction is a branch instruction. For example, instruction decode unit 46, as a result of decoding the instruction, can determine if the instruction is actually a branch instruction. If it is not, method 250 returns to block 252 in which a next valid instruction can be received by instruction decode unit 46. If it is determined to be a branch instruction, method 250 proceeds to block 262 in which the branch target address of the branch instruction is either calculated or fetched. For example, this may be done as part of the branch resolution performed by branch execution unit 49. Method 250 then proceeds to decision diamond 264 in which it is determined whether the branch was mispredicted. For example, the branch could have been mispredicted as taken (such as by the prediction information from BTB 28) when it was actually not taken or vice versa. If the branch was not mispredicted, processing of the branch instruction continues through the pipeline and method 250 returns to block 252 in which a next valid instruction is received by instruction decode unit 46.

If, at decision diamond 264, it is determined that the branch is mispredicted, method 250 proceeds to decision diamond 266 in which it is determined whether the branch instruction was predicted as a branch instruction by BTB 28. If so, method 250 proceeds to block 268 in which BTB 28 is updated as needed. For example, an instruction is predicted as a branch instruction when it results in a hit in BTB 28. However, although the branch instruction resulted in a hit, the prediction information provided with the hit from BTB 28 resulted in a branch misprediction. Therefore, the entry of BTB 28 which corresponds to the mispredicted branch instruction may need to be updated. If, at decision diamond 266, the branch instruction was not predicted as a branch instruction (because, for example, it missed in BTB 28), method 250 proceeds to decision diamond 270. At this point, since the current valid instruction is actually a branch instruction but missed in BTB 28, a new entry in BTB 28 can be allocated for the branch instruction, as will be described below in reference to the remaining portion of method 250.

Referring to decision diamond 270, if the same page counter is not greater than zero, method 250 proceeds to block 272 in which the same page counter is set to one. Note that same page counter (e.g. counter 55 of FIG. 2) was reset to zero in block 258 if the next sequential instruction address to the current address resulted in crossing a page boundary. Therefore, due to the page boundary crossing, a full tag address should be allocated into BTB 28. From block 272, method 250 proceeds to block 278 in which way 6 or way 7 is selected for allocation for the current branch address since only ways 6 and 7 in the illustrated embodiment are configured to store full tag addresses. When an entry is allocated into the selected way of way 6 or 7, the full tag address is stored in the entry. The determination of which of ways 6 or 7 to select can then be made based on the branch target address, as will be discussed in reference to the portion of method 250 in FIG. 12.

Referring back to decision diamond 270, if the same page counter is greater than 0, method 250 proceeds to decision diamond 290 in which it is determined if the current page address (e.g. the page address of the current branch instruction) is already in page address CAM 104. For example, control and interface 52 may communicate with BTB control circuitry 102 of BTB 28 to determine whether the current page address is in page address CAM 104. If it is, method 250 proceeds to block 296 in which one of ways 0-5 can be selected for allocation and the existing entry in page address CAM 104 can be used for the allocation. That is, when an entry is allocated into the selected way of ways 0-5, the tag portion of the current branch instruction address can be stored in the entry and a select value of the entry can be set to select the existing entry in page address CAM 104. The determination of which of ways 0-5 to select can then further be made based on the branch target address, as will be discussed below in reference to the portion of method 250 in FIG. 12.

Referring back to decision diamond 290, if the current page address is not already in page address CAM 104, then method 250 proceeds to decision diamond 292 in which it is determined whether a threshold for same page is met. For example, in one embodiment, same page threshold 57, which may be located in control and interface 52 of CPU 30, may be used to determine whether or not to allocate a new entry in page address CAM 104. In one embodiment, a new entry in page address CAM 104 is not allocated until a certain number of branch instructions have occurred on a same page of memory. For example, in one embodiment, only on the third occurrence of a branch instruction on a particular page of memory (whose page address is not already present in page address CAM 104) is a new entry allocated. Therefore, referring to decision diamond 292, if the same page threshold is not met for the current page address, method 250 proceeds to block 298 in which same page counter 55 is incremented. Therefore, upon a subsequent branch instruction which occurs on the same page (thus proceeding from block 254, to decision diamond 256, to decision diamond 260, to block 262, and continuing down to decision diamond 292 again), same page counter 55 can again be incremented until the same page threshold is met by a branch instruction. Note that once a branch instruction crosses a page boundary, though, same page counter 55 is reset back to zero (in block 258). After block 298, method 250 continues to block 278 in which way 6 or 7 can be selected for allocation for the current branch instruction. That is, since the threshold for same page was not met, a new entry in page address CAM 104 is not being allocated and thus the full tag address needs to be stored to BTB 28 upon allocation. In the current example, only ways 6 and 7 allow for the storing the full target address. The determination of which of ways 6 and 7 to select can then further be made based on the branch target address, as will be discussed below in reference to the portion of method 250 in FIG. 12.

Referring back to decision diamond 292, if the threshold for same page has been met (i.e. there have been sufficient branch instructions occurring within the same page of memory), method 250 proceeds to block 294 in which an entry in page address CAM can be allocated for storing the page address of the current branch instruction. Any protocol may be used to determine which entry in page address CAM 104 to allocate, such as, for example, least recently used (LRU), pseudo LRU (PLRU), round robin, etc. Method 250 then continues with block 295 in which in which one of ways 0-5 can be selected for allocation and the existing entry in page address CAM 104 can be used for the allocation. That is, when an entry is allocated into the selected way of ways 0-5 in BTB array 106, the tag portion of the current branch instruction address can be stored in the entry and a select value of the entry can be set to select the newly allocated entry in page address CAM 104. The determination of which of ways 0-5 to select can then further be made based on the branch target address, as will be discussed below in reference to the portion of method 250 in FIG. 12.

Method 250 continues with point A on FIG. 12. After each of blocks 278, 295, and 296, method 250 continues, via point A, to block 280, located in FIG. 12. In block 280, the page address of the branch target address of the current branch instruction (determined, for example, in block 262) is compared with the page address of the current branch instruction address. Method 250 continues to decision diamond 282 in which it is determined whether the page addresses of the branch target address and the branch instruction address match. If so, method 250 continues to block 288 in which, if way 6 or 7 was selected for allocation (such as when method 250 entered point A from block 278), then way 6 is selected for allocation, and if ways 0-5 was selected for allocation (such as when method 250 entered point A from blocks 295 or 296), then one of way 0-3 is selected for allocation. That is, if the page addresses matched at decision diamond 282, then the branch target is located on a same memory page as the branch instruction. In this case, a way of BTB 28 can be selected for allocation which allows for a short TA to be stored, and in the current example, entries in ways 0-3 and way 6 store short TAs, as described above. Note that BTB control circuitry 102 may use any method to select one of way 0-3 for allocation, such as, for example, LRU, PLRU, round robin, etc. Upon allocating an entry in way 6 or one of ways 0-3, BTB control circuitry 102 can use information received from branch execution unit 49 of CPU 30 (such as, for example, the branch address, branch TA, branch status) to store the necessary information into an entry of the selected way. Furthermore, BTB control circuitry 102 can use the index portion of the branch target address to select the set of the selected way in which to store the new BTB entry.

Referring back to decision diamond 282, if the page addresses of the branch target address and the branch instruction do not match, method 250 proceeds to block 284 in which same page counter 55 is again reset. Method 250 then proceeds to block 286 in which, if way 6 or 7 was selected for allocation (such as when method 250 entered point A from block 278), then way 7 is selected for allocation, and if ways 0-5 was selected for allocation (such as when method 250 entered point A from blocks 295 or 296), then one of way 4 or 5 is selected for allocation. That is, if the page addresses did not match at decision diamond 282, then the branch target is not located on a same memory page as the branch instruction. In this case, a way of BTB 28 is selected for allocation which allows for a full TA to be stored, and in the current example, entries in ways 4, 5, and 6 store full TAs, as described above. Note that BTB control circuitry 102 may use any method to select one of ways 4 or 5 for allocation, such as, for example, LRU, PLRU, round robin, etc. Upon allocating an entry in way 7 or one of ways 4 or 5, BTB control circuitry 102 can use information received from branch execution unit 49 of CPU 30 (such as, for example, the branch address, branch TA, branch status) to store the necessary information into an entry of the selected way. Furthermore, BTB control circuitry 102 can use the index portion of the branch target address to select the set of the selected way in which to store the new BTB entry. After blocks 288 and 286, method 250 ends.

Figure 13:
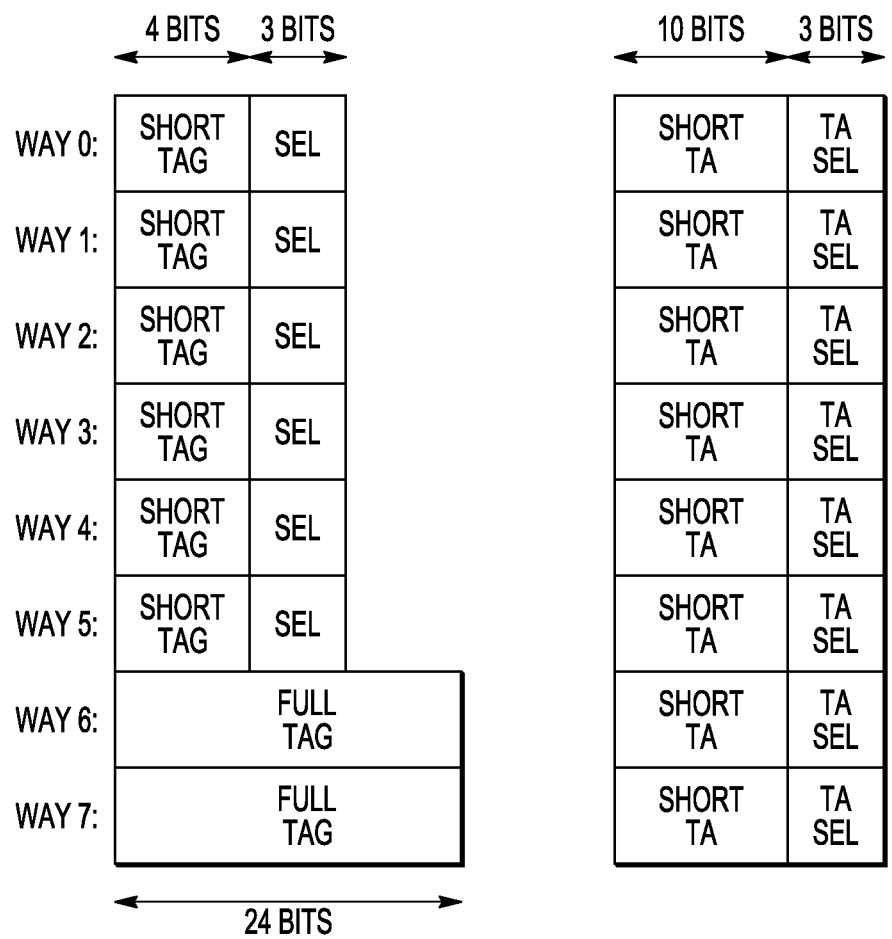
FIG. 13 illustrates in diagrammatic form an embodiment of the tags and targets of the BTB of FIG. 3 in accordance with one aspect of the present invention.
Figure 14:
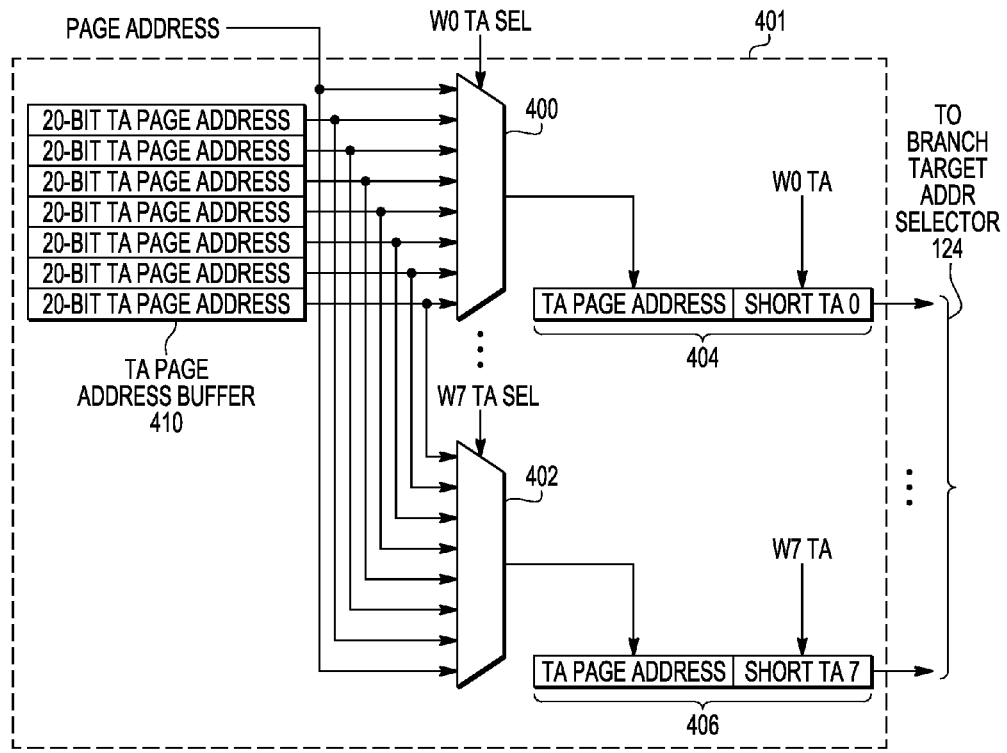
FIG. 14 illustrates in block diagram form, an embodiment of a branch targets generator of FIG. 3 in accordance with one aspect of the present invention.

FIG. 13 illustrates another example of how ways 0-7 of BTB 28 may be organized. For example, referring to FIG. 13, the tag entries for each way may be the same as in FIG. 4 where the description provided above with respect to FIG. 4 would apply. That is, the entries in each of way 0 through way 5 store a short tag address and corresponding select bits for the short tag address, and the entries in each of ways 6 and 7 store a full tag address. Therefore, as described above, the select field is used to provide the remaining upper bits of the tag address such as by selecting the appropriate page address match indicator provided by page address CAM 104. However, unlike the embodiment of FIG. 4, the embodiment of FIG. 13 indicates that each entry in each way stores a short TA and a corresponding select field for the short TA. In this example, a TA page address buffer (as illustrated in FIG. 14) may be used to store the upper bits of the TA and the select field of each entry may be used to select the remaining upper bits of the TA. In the example provided above, which assumes a page size of 4K bytes, the short TA is 10 bits and the full TA being generated is 30 bits. The select field includes enough bit to select an appropriate entry from the TA page address buffer to complete the full TA. For example, as will be described below, the select field for the short TA may also be 3 bits.

FIG. 14 illustrates a branch targets generator 401 in accordance with the example of FIG. 13, in which branch targets generator 401 of FIG. 14 may be used in place of branch targets generator 119 of FIG. 1. Branch targets generator 401 receives each of w0 TA through w7 TA from the selected set of BTB array 106. In this example, though, each of w4 TA, w5 TA, and w7 TA would also be short target addresses like w0 TA through w3 TA and w6 TA. Branch targets generator 401 also receives each of w0 TA sel through w7 TA sel from the selected set. Branch targets generator 401 includes a TA page address buffer 410 and a multiplexer for each way, including a multiplexer (MUX) 400 for w0 and a multiplexer (MUX) 402 for w7. TA page address buffer 410 includes 7 entries, each storing a 20-bit TA page address (corresponding to the remaining upper 20 bits of a full TA). Each MUX, such as MUX 400 and 402, receives the current page address (the page address portion of instruction address 100), and each of the 7 entries of TA page address buffer 410, and based on its corresponding select signal, one of w0 TA sel-w7 TA sel, each MUX outputs a selected TA page address. Therefore, in the illustrated embodiment in which TA page address buffer 410 includes 7 entries, each TA select field includes 3 bits in which a value of "000" may select the current page address portion of instruction address 100 in FIG. 2, and a value of "001-111" selects one of the seven entries of buffer 410. For example, referring to MUX 400 which corresponds to w0, a value of "000" for w0 TA sel results in the current page address being output by MUX 400, a value of "001" results in a first entry of buffer 410 being output by MUX 400, a value of "010" results in a second entry of buffer 410 being output by MUX 400, etc. Concatenation circuitry, such as concatenation circuitry 404 and 406, is then provided at the output of each MUX to generate the full TA which is provided to branch target address selector 124, described above. For example, concatenation circuitry 404 concatenates the TA page address provided by MUX 400 with w0 TA (which is a short TA). Similarly, MUX 402 uses w7 TA sel to select an appropriate TA page address which is provided to concatenation circuitry 406 to be concatenated with w7 TA.

Figure 15:
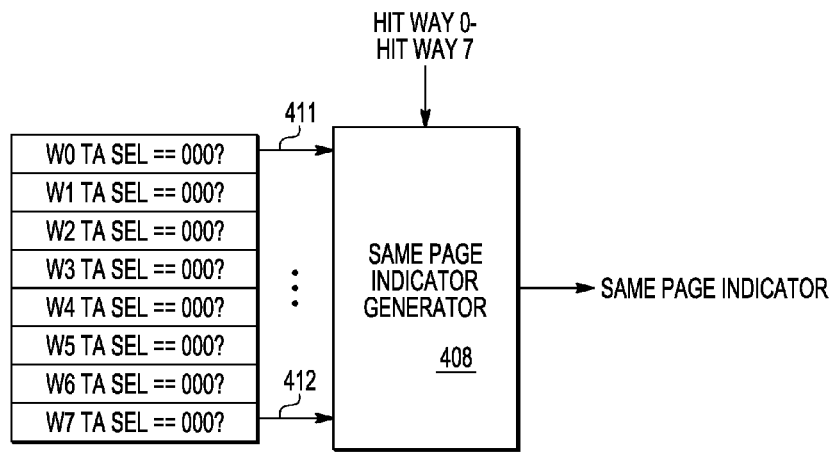
FIG. 15 illustrates in block diagram form an embodiment of the same page indicator generator of the BTB of FIG. 3 in accordance with one aspect of the present invention.

FIG. 15 illustrates a same page indicator generator 408 which may be used with the example of FIGS. 13 and 14, in place of same page indicator generator 158 of FIG. 9, to generate the same page indicator. Same page indicator generator 408 receives an indicator for each way (including indicators 411 and 412) which indicates whether the target address is on the same page as the current page address. That is, each of the indicators, such as indicators 411 and 412, are asserted if the corresponding select signal equals "000" (which indicates that the current page address was selected for concatenation with the short TA by branch targets generator 401). The hit signals hit way 0-hit way 7 are used to select the appropriate indicator received by same page indicator generator 408 to be provided as the same page indicator. Note that if the corresponding TA sel signal is anything but "000", then it is assumed that the page address (which was selected from TA page address buffer 410) is not on the same page as the current page address (as the current branch instruction).

Therefore, note that methods 10-12 described above can be modified accordingly for both generating a branch target address and for allocation to accommodate the short TAs and corresponding select field described in reference to FIGS. 13-15. Also, note that, in alternate embodiments, only a subset of ways may store both a short TA and a corresponding select field while the remaining ways may store full TAs.

By now it should be appreciated that there has been provided a BTB with improved storage efficiency. In one embodiment, different ways of the BTB may be used to store different sizes of tag addresses and different sizes of TAs. For example, the entries of some of the ways of the BTB may be used to store short tag addresses and the entries of the other ways of the BTB may be used to store full tag addresses. Similarly, the entries of the some of the ways of the BTB may be used to store short TAs and the entries of the other ways of the BTB may be used to store full TAs. For any particular way, entries can be configured to store any combination of short/full tag address and short/full TAs. Furthermore, those entries which are used to store short tag addresses, and additional select field may be stored to indicate the remaining address bits of the short tag addresses. For example, the remaining address bits of the short tag addresses may correspond to the page addresses of the short tag addresses and may be stored in a page address buffer, in which the select field is used to select the appropriate page address from the page address buffer. In this manner, storage space for the BTB may be reduced. Similarly, those entries which are used to store short TAs may also include a corresponding select field used to provide the remaining address bits of the short TA from a TA page address buffer.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 16 may be located on a same integrated circuit as processor 12 or on a separate integrated circuit or located within another peripheral or slave discretely separate from other elements of data processing system 10. Peripherals 18 and 20 may also be located on separate integrated circuits or devices.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 16 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, the number of bits used in the address fields may be modified based upon system requirements. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following includes various embodiments of the present invention.

Item 1 includes a data processor including a branch target buffer (BTB) including a plurality of BTB entries grouped in ways, wherein the BTB entries in one of the ways include a short tag address and the BTB entries in another one of the ways include a full tag address. Item 2 includes the processor of claim 1 and further includes the BTB entries in one of the ways include a short target address and the BTB entries in another one of the ways include a full target address. Item 3 includes the processor of item 1 and further includes a control and interface unit configured to: keep track of a number of branch instruction entries allocated in the BTB that are on the same page; maintain a same page status counter to indicate a number of the previously-received branch instructions that were on the same page; wherein the BTB allocates an entry in a page address buffer if an entry is not already in the page address buffer when the number of branch instruction entries reaches a threshold number. Item 4 includes the processor of item 1, and further includes a page address buffer that includes entries for page address portions of a plurality of previously-received branch instructions in relation to the short tag address; wherein the entries in the BTB that include the short tag address further include a select field that is used to select one of the entries in a page address buffer. Item 5 includes the processor of item 1, and further includes the BTB entries include a short target address; a page target address buffer that includes entries for page address portions of a plurality of previously-received target addresses of branch instructions; and the BTB entries include a target select field that is used to select one of the entries in the page target address buffer. Item 6 includes the processor of item 2, wherein the BTB is configured to: for the short target address, concatenate a page address portion of a current branch instruction having a same page address with a selected short target address to determine a branch target address for the instruction. Item 7 includes the processor of item 5, wherein the BTB is configured to: concatenate a page address portion of a current branch instruction or previously-received page address portion from the page target address buffer having a same page address with a selected short target address to determine a branch target address for the current branch instruction.

Item 8 includes a data processor including a set associative branch target buffer (BTB) array including sets of BTB entries grouped in ways, wherein the BTB entries in the sets of a first one of the ways include a short tag address field and the BTB entries in the sets of a second one of the ways include a full tag address field. Item 9 includes the processor of item 8, and further includes a control and interface unit configured to: maintain a same page status counter to indicate a number of branch instructions that are on a same page; and a page address buffer that includes page address entries for the branch instructions that are on the same page. Item 10 includes the processor of item 8, wherein the number of bits allotted for the short tag address field is one of the group consisting of: less than the number of bits allotted for the full tag address field, and based on a page address of a memory management unit (MMU). Item 11 includes the processor of item 8, and further includes a first comparator configured to receive a short tag address from an incoming instruction and a short tag address from a selected set in the ways that include the short tag address field, the comparator is further configured to output a short way tag match signal that indicates whether the short tag address from the incoming instruction was equal to one of the short tags from the selected set in the ways that include the short tag address field. Item 12 includes the processor of item 11, and further includes a page address buffer configured to store entries that include page addresses from previously received instruction addresses; a match indicator select unit configured to receive the entries from the page address buffer and the select field from the selected set in the ways that include the short tag address field; and wherein the BTB entries in the sets of the first one of the ways include a select field that indicates an entry in a page address buffer for the selected set. Item 12 includes the processor of item 12, and further includes a second comparator configured to receive a full tag address from the incoming instruction and a full tag address from the selected set in the ways that include the full tag address field, the second comparator is further configured to output a long hit way signal indicating whether the full tag address from the incoming instruction was equal to one of the full tag addresses from the selected set in the ways that include the full tag address field. Item 14 includes the processor of item 12, and further includes a logic circuit configured to receive a short way tag match signal from the first comparator and a way page match signal from the match indicator select unit, the logic circuit is further configured to output a short hit way signal indicating whether the page address of the incoming instruction address is already present in the page address buffer.

Item 14 includes a method, in a processor having a branch target buffer (BTB) including sets of BTB entries grouped in ways, in which the method includes receiving a branch instruction address; and using an index portion of the instruction address to select one of the sets, wherein the BTB entries in the sets of a first group of the ways include a short tag address portion and the BTB entries in the sets of a second group of the ways include a full tag address portion. Item 16 includes the method of item 15, and further includes for the first group of the ways, determining whether the short tag address portions in the selected set match a tag portion of the branch instruction address; generating page address match indicators by comparing a page address portion of the instruction address to entries in a page address buffer, wherein the entries in the page address buffer include page addresses from previously-received instruction addresses; and generating way page matches from the page address match indicators based on select fields of the selected set. Item 17 includes the method of item 16, and further includes for the first group of the ways, generating hit way signals based on the way tag matches and way page matches; and generating a way branch target address by concatenating the page address portion of the instruction address with a target address of the selected set. Item 18 includes the method of item 16, and further includes keeping track of a number of branch instruction entries allocated in the BTB that are on the same page; and allocating an entry in a page address buffer if an entry is not already in the page address buffer when the number of branch instruction entries reaches a threshold number. Item 19 includes the method of item 18, and further includes for the second group of the ways, generating hit way signals for the selected set by determining whether a page address portion and a tag portion of the instruction address is equal to the full tag address portion of the selected set; and providing a target address of the selected set as a way branch target address. Item 20 includes the method of item 19, and further includes providing a same page indicator and prediction information with the way branch target address to the processor.

What is claimed is:

1. A data processor comprising:
   a branch target buffer (BTB) including a plurality of BTB entries grouped in ways, wherein the BTB entries in one of the ways include a short tag address and the BTB entries in another one of the ways include a full tag address; and
   a page address buffer that includes entries for page address portions of a plurality of previously-received branch instructions in relation to the short tag address;
   wherein the entries in the BTB that include the short tag address further include a select field that is used to select one of the entries in a page address buffer.

2. The processor of claim 1, further comprising:
   the BTB entries in one of the ways include a short target address and the BTB entries in another one of the ways include a full target address.

3. The processor of claim 1, further comprising:
   a control and interface unit configured to:
      keep track of a number of branch instruction entries allocated in the BTB that are on the same page;
      maintain a same page status counter to indicate a number of the previously-received branch instructions that were on the same page;
      wherein the BTB allocates an entry in a page address buffer if an entry is not already in the page address buffer when the number of branch instruction entries reaches a threshold number.

4. The processor of claim 1, further comprising,
   the BTB entries include a short target address;
   a page target address buffer that includes entries for page address portions of a plurality of previously-received target addresses of branch instructions; and
   the BTB entries include a target select field that is used to select one of the entries in the page target address buffer.

5. The processor of claim 2, wherein:
   the BTB is configured to:
      for the short target address, concatenate a page address portion of a current branch instruction having a same page address with a selected short target address to determine a branch target address for the instruction.

6. The processor of claim 4, wherein the BTB is configured to:
   concatenate a page address portion of a current branch instruction or previously-received page address portion from the page target address buffer having a same page address with a selected short target address to determine a branch target address for the current branch instruction.

7. A data processor comprising:
   a set associative branch target buffer (BTB) array including sets of BTB entries grouped in ways, wherein the BTB entries in the sets of a first one of the ways include a short tag address field and the BTB entries in the sets of a second one of the ways include a full tag address field;
   a first comparator configured to receive a short tag address from an incoming instruction and a short tag address from a selected set in the ways that include the short tag address field, the comparator is further configured to output a short way tag match signal that indicates whether the short tag address from the incoming instruction was equal to one of the short tags from the selected set in the ways that include the short tag address field;
   a page address buffer configured to store entries that include page addresses from previously received instruction addresses; and
   a match indicator select unit configured to receive the entries from the page address buffer and the select field from the selected set in the ways that include the short tag address field; and
   wherein the BTB entries in the sets of the first one of the ways include a select field that indicates an entry in a page address buffer for the selected set.

8. The processor of claim 7, further comprising:
   a control and interface unit configured to:
      maintain a same page status counter to indicate a number of branch instructions that are on a same page; and
   a page address buffer that includes page address entries for the branch instructions that are on the same page.

9. The processor of claim 7, wherein the number of bits allotted for the short tag address field is one of the group consisting of: less than the number of bits allotted for the full tag address field, and based on a page address of a memory management unit (MMU).

10. The processor of claim 7, further comprising:
a second comparator configured to receive a full tag address from the incoming instruction and a full tag address from the selected set in the ways that include the full tag address field, the second comparator is further configured to output a long hit way signal indicating whether the full tag address from the incoming instruction was equal to one of the full tag addresses from the selected set in the ways that include the full tag address field.

11. The processor of claim 7, further comprising:
a logic circuit configured to receive a short way tag match signal from the first comparator and a way page match signal from the match indicator select unit, the logic circuit is further configured to output a short hit way signal indicating whether the page address of the incoming instruction address is already present in the page address buffer.

12. In a processor having a branch target buffer (BTB) including sets of BTB entries grouped in ways, a method comprising:
receiving a branch instruction address;
using an index portion of the instruction address to select one of the sets, wherein the BTB entries in the sets of a first group of the ways include a short tag address portion and the BTB entries in the sets of a second group of the ways include a full tag address portion; and
for the first group of the ways,
determining whether the short tag address portions in the selected set match a tag portion of the branch instruction address;
generating page address match indicators by comparing a page address portion of the instruction address to entries in a page address buffer, wherein the entries in the page address buffer include page addresses from previously-received instruction addresses; and
generating way page matches from the page address match indicators based on select fields of the selected set.

13. The method of claim 12, further comprising:
for the first group of the ways,
generating hit way signals based on the way tag matches and way page matches; and
generating a way branch target address by concatenating the page address portion of the instruction address with a target address of the selected set.

14. The method of claim 12, further comprising:
keeping track of a number of branch instruction entries allocated in the BTB that are on the same page; and
allocating an entry in a page address buffer if an entry is not already in the page address buffer when the number of branch instruction entries reaches a threshold number.

15. The method of claim 14, further comprising:
for the second group of the ways,
generating hit way signals for the selected set by determining whether a page address portion and a tag portion of the instruction address is equal to the full tag address portion of the selected set; and
providing a target address of the selected set as a way branch target address.

16. The method of claim 15, further comprising:
providing a same page indicator and prediction information with the way branch target address to the processor.

* * * * *